United States Patent [19]
Downs

[11] 3,849,037
[45] Nov. 19, 1974

[54] COMBINATION APEX AND CORNER SEAL SPRING FOR ROTARY ENGINE

[75] Inventor: Thomas C. Downs, Dayton, Ohio

[73] Assignee: General Motors Corporation, Detroit, Mich.

[22] Filed: June 11, 1973

[21] Appl. No.: 368,602

[52] U.S. Cl. .............................................. 418/121
[51] Int. Cl. .......................................... F04c 27/00
[58] Field of Search ............ 418/121, 122, 123, 142

[56] References Cited
UNITED STATES PATENTS
3,761,207  9/1973  Seidl .................................. 418/121

FOREIGN PATENTS OR APPLICATIONS
1,245,636  7/1967  Germany ............................ 418/121
1,116,951  11/1961  Germany ............................ 418/122

Primary Examiner—C. J. Husar
Assistant Examiner—Leonard Smith
Attorney, Agent, or Firm—Ronald L. Phillips

[57] ABSTRACT

A single spring biases both an apex seal and two corner seals at each corner of a rotor in a rotary combustion engine so that the apex seal continuously engages the engine's inwardly facing peripheral wall and the corner seals continuously engage the engine's oppositely facing end walls.

3 Claims, 4 Drawing Figures

PATENTED NOV 19 1974 3,849,037

COMBINATION APEX AND CORNER SEAL SPRING FOR ROTARY ENGINE

This invention relates to biasing both an apex seal and two corner seals at each corner of a rotor in a rotary engine and more particularly to a single spring providing such bias.

In current production rotary combustion engines there is provided an apex seal and two corner seals at each corner of the engine's rotor with a leaf spring biasing each of the apex seals to engage the engine's inwardly facing internal peripheral wall and separate U-shaped leaf or wire springs biasing the corner seals to engage the engine's oppositely facing inner end walls as the rotor turns. In the current production rotary combustion engine which has a three-corner rotor that operates within a two-lobed inwardly facing peripheral wall, nine springs are thus required to effect the necessary bias of the apex seals and corner seals.

An object of the present invention is to reduce the number of springs required to bias the apex seals and corner seals in a current production type rotary combustion engine.

Another object is to provide in a rotary combustion engine having a rotor with an apex seal and two corner seals at each corner thereof, a single leaf spring that is operable to bias the apex seal while also biasing the two corner seals associated therewith.

Another object is to provide in a rotary engine having a rotor with an apex seal and two corner seals at each corner a leaf spring that has a mid portion shaped to bias an apex seal and also has opposite end portions which are shaped to bias the corner seals associated therewith.

These and other objects of the present invention will become more apparent with reference to the following description and drawing in which.

Figure 1:
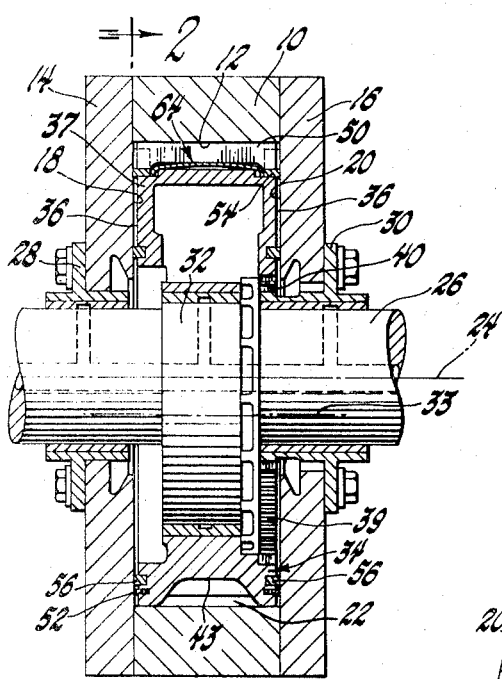
FIG. 1 is a longitudinal view with parts in section of a rotary conbustion engine having apex and corner seal spring arrangements according to the present invention.
Figure 2:
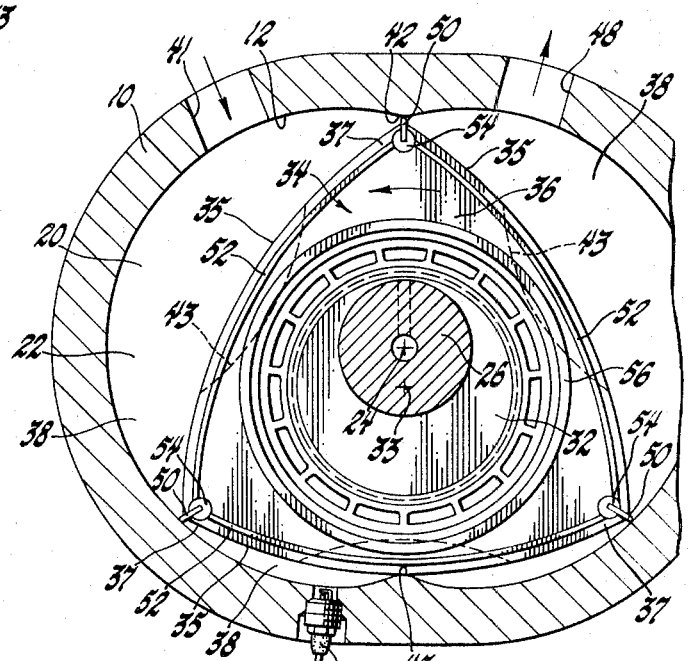
FIG. 2 is a view of the engine taken along the line 2—2 in FIG. 1.

The combination apex and corner seal spring according to the present invention is for use in rotary engines including rotary combustion engines, compressors, pumps and the like. Referring to FIG. 1, the rotary engine may, for example, be an internal combustion engine of current production type having a stationary outer body comprising a rotor housing 10 having an inwardly facing inner peripheral wall 12 and a pair of end housings 14 and 16 having parallel, oppositely facing, spaced, inner end walls 18 and 20, respectively. The housing parts are rigidly secured together by bolts, not shown, with the inner walls 12, 18 and 20 cooperatively providing a cavity 22. Referring to FIG. 2, the peripheral wall 12 is in the shape of a two-lobed epitrochoid or a curve parallel thereto whose center line is indicated at 24. A crankshaft 26 extends through the cavity 22 and is rotatably supported in bearing lined collars 28 and 30 that are bolted to the end housings 14 and 16, respectively, as shown in FIG. 1; the crankshaft axis being coincident with the center line 24, parallel to the peripheral wall 12 and perpendicular to the end walls 18 and 20. The crankshaft 26 is provided in cavity 22 with an eccentric 32 whose center line 33 parallels the crankshaft axis 24. A rotor 34 has a central hub having a bearing press-fitted therein which is received on the eccentric 32 whereby the rotor 34 is supported in cavity 22 for rotation about the eccentric's center line 33 which is thus the rotor's axis. The rotor 34 has the general shape of a triangle with three outwardly facing convex peripheral flanks or faces 35 which face the peripheral wall 12 and sides 36 which face the end walls 18 and 20 and as the rotor turns with respect to the peripheral wall 12 on the turning crankshaft 26 as will be described in more detail later, each of the rotor's corners 37 remains close to the peripheral wall 12 whereby the rotor faces 36 cooperate with the wall 12 and also with the end walls 18 and 20 to define three variable volume working chambers 38 that are spaced around the rotor and move with the rotor within the housing as the rotor rotates about its axis while planetating with respect to the crankshaft axis.

With the two-lobed peripheral wall 12 and the three corner rotor 34, each of the working chambers 38 sequentially expands and contracts between minimum and maximum volume during each rotor revolution in fixed relation to the housing by forcing the rotor to rotate at one-third the speed of the crankshaft. This is accomplished by gearing comprising an internal tooth gear 39 which is concentric and integral with rotor 34. The gear 39 meshes with an external tooth gear 40 which is received with clearance about and is concentric with the crankshaft 26 and is made stationary by being formed integral with the right-hand collar 30 as shown in FIG. 1. The gear 39 has one and one-half times the number of teeth as the gear 40 to provide the required speed ratio of 3:1 between the crankshaft and rotor.

A combustible air-fuel mixture from a suitable carburetor arrangement, not shown, is made available to working chambers 38 by an intake port 41 in rotor housing 10 as shown in FIG. 2. Passage 41 opens to the cavity 22 on the leading side of cusp 42 of the peripheral wall 12 relative to the direction of rotor rotation indicated by the arrow in FIG. 2. A single channel or recess 43 is provided in the center of each chamber face of the rotor to provide for the transfer of working gases past the peripheral wall's other cusp 45 when a rotor face is at or near its top-dead-center position, as shown in FIG. 2, so that the chambers are not divided by the cusp 45 at the time when combustion is to occur therein. A spark plug 46 is mounted in the rotor housing 10 adjacent the cusp 45 with its electrodes exposed to the working chambers. As the rotor planetates, the working chambers successively draw in fuel mixture as the leading rotor corners pass the intake port 41. The trailing corner of the rotor for each chamber then closes this chamber to the intake port whereafter the fuel mixture is thus trapped and then compressed and when the rotor face of this chamber is in the vicinity of top-dead-center, this mixture is ignited at the completion of the compression phase; there being provided a suitable ignition system, not shown, for providing voltage to the spark plug at the proper time. Upon ignition of the mixture in each working chamber the peripheral wall takes the reaction forcing the rotor to continue turning while the gas is expanding. The leading rotor corner of each working chamber eventually traverses an exhaust port 48 in the rotor housing on the trailing side of the cusp 42 whereby the exhaust products are then expelled to complete the cycle.

Sealing of the chambers 38 for such 4-cycle internal combustion engine operation is mandatory and is typically provided by three apex seals 50 which are urged to engage peripheral wall 12. The apex seals 50 are rectangularly shaped in cross-section and are each mounted in an axially extending radially outwardly facing rectangularly shaped groove 51 that is located at each apex or corner 37 of the rotor and extends the axial width thereof. Three arcuate shaped side seals 52 are mounted in accommodating axially outwardly facing grooves in each rotor side 36 and extend adjacent a rotor face between two apex seals 50 and are urged to engage the opposing end wall. Furthermore, three cylindrically shaped corner seals 54 are each mounted in a cylindrical hole 55 in each rotor side with each corner seal urged to engage the opposing end wall and providing sealing between the adjacent ends of two side seals and one apex seal as shown in FIG. 2. In addition to this gas sealing arrangement there is also provided radially inward thereof a circular oil seal 56 that is mounted in an accommodating axially outwardly facing groove in each rotor side and is urged to engage the opposing end wall.

Figure 3:
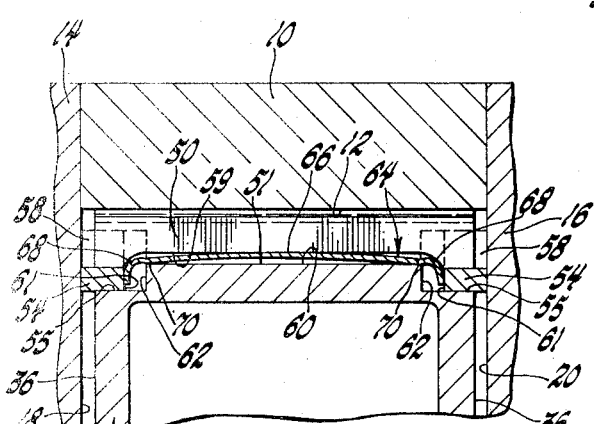
FIG. 3 is an enlarged view of one corner of the rotor in FIG. 1.

In the gas sealing arrangement at each corner of the rotor as best shown in FIG. 3, the two corner seal accommodating holes 55 are axially aligned with each other and are centered and contiguous with the apex seal groove 51. Furthermore, each of the corner seals 54 has a rectangularly shaped radially outwardly facing slot 58 which closely receives one end of the associated apex seal 50 to permit sliding movement therebetween in their mutually perpendicular directions of movement on the rotor while maintaining sealing therebetween. Typically, each of the apex seals 50 would be biased by a leaf spring fitting between the concave bottom 59 thereof and the flat bottom 60 of the apex seal groove 51 while the corner seals 54 would be biased to continuously engage the respective end walls 18 and 20 by separate U-shaped springs located between the flat inner end 61 of the corner seals 54 and the flat bottom 62 of the accommodating corner seal holes 55. It will also be understood that suitable spring means such as wave springs would be provided to bias the side seals 52 and oil seals 56 against the end walls; however, such spring means form no part of the present invention.

Figure 4:
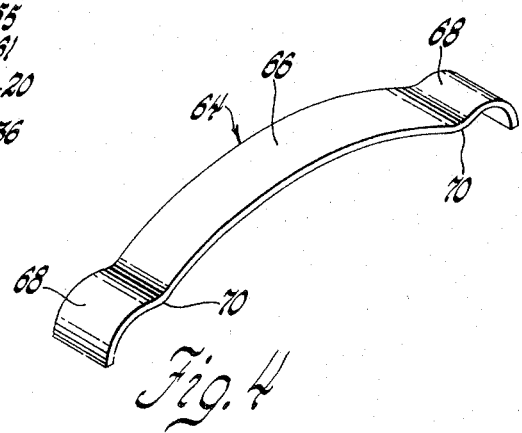
FIG. 4 is an enlarged perspective view of the seal spring according to the present invention.

According to the present invention there is provided, instead of three springs for each arrangement of an apex seal and two corner seals, a single leaf spring 64 of suitable material such as stainless steel that as best shown in FIG. 3 fits within the already available space between the bottom 59 of the apex seal 50 and the bottom 60 of the apex seal groove 51 and between the two inner ends 61 of the associated pair of corner seals 54 and the bottoms 62 of their accommodating holes 55. As shown in FIG. 4 in an unloaded condition, the combination apex and corner seal spring 64 has a rectangular cross-section and is formed so that it has an elongated radially outwardly facing convex portion 66 intermediate two axially outwardly facing convex end portions 68 with tight reverse or concave bends that provide spaced seat portions 70 joining the intermediate portion 66 and the end portions 68. The axial length of the intermediate portion 66 with its single arcuate curve is less than that of the apex seal groove bottom 60 and the radial height of the end portions 68 with their single arcuate curve is less than the distance between the apex seal groove bottom 60 and the wall of corner seal holes 55 so that the spring 64 is positionable as shown in FIG. 3 with the seat portions 70 seated on the apex seal groove bottom 60 near the ends thereof and the end portions 68 received with clearance in the corner seal holes 55. The intermediate spring portion 66 engages along a center portion on the outer side with the bottom 59 of the apex seal 50 to bias the apex seal radially outward against the peripheral wall 12 while the end portions 68 located in the corner seal holes 55 engage on the outer side with the inner ends 61 of the corner seals 54 to bias the corner seals in a direction perpendicular to the apex seals and outwardly against the end walls 18 and 20. In this spring force system the reaction for the apex seal bias is thus taken at the axially spaced seat portions 70 where they seat on the radially inner spring side with the apex seal groove bottom 60 while the reaction for the corner seal bias results from the trapping of the spring by these corner seals. Typically, the spring force required to bias the apex seals is substantially greater than that required for the corner seals. This difference in spring force requirements is met by the present invention in that the spring 64 takes apex seal movement in compression in the elongated intermediate spring portion 66 between the spaced supporting spring seat portions 70 and takes corner seal movement in tension with bending of the end spring portions 68 about the supporting spring seat portions 70. Thus, spring 64 is stiffer in the radial direction than in the axial direction and is readily tailored to specific requirements, observing that this difference in stiffness increases as the distance between the spring seat portions 70 is reduced.

Thus, the combination apex seal and corner seal spring according to the present invention provides the same seal biasing effects heretofore performed by three separate springs and therefore greatly reduces the number of parts required in a rotary engine that is already credited with having very few parts. Furthermore, the present seal spring in addition to reducing manufacturing costs also has the added advantage of reducing spring assembly time and in making assembly easier as compared with the proper positioning of several different springs.

The above described preferred embodiment is illustrative of the invention which may be modified within the scope of the appended claims:

I claim:

1. In a rotary machine, a housing having an inwardly facing inner peripheral wall and a pair of spaced oppositely facing inner end walls, a rotor rotatably mounted in said housing having sides opposite said end walls and a plurality of corners that remain adjacent said peripheral wall as said rotor rotates, said rotor and said housing walls cooperatively defining a plurality of chambers separated by said rotor corners that expand and contract as said rotor rotates, each said rotor corner having an apex seal groove extending thereacross facing outwardly toward said peripheral wall and also having a corner seal hole in each said rotor side contiguous with said apex seal groove and facing outwardly toward one of said end walls, an apex seal mounted in said apex seal groove for engaging said peripheral wall, a corner seal mounted in each said corner seal hole for engaging the opposite end wall, said apex seal and said apex seal groove having bottoms with an apex seal spring space therebetween, said corner seals and said corner seal holes having bottoms with corner seal spring spaces therebetween open to said apex seal spring space, a single spring located in said spaces, said spring having two end portions and an intermediate portion of substantially greater length than said end portions with each said portion having a curved shape and with seat portions joining said intermediate portion and said end portions, said intermediate portion arranged in said apex seal spring space with all said seat portions positively seating on said apex seal groove bottom adjacent the ends thereof and engaging said bottom of said apex seal to bias said apex seal outwardly against said peripheral wall and with said end portions extending freely into said corner seal spring spaces and engaging said bottoms of said corner seals to bias said corner seals outwardly against said end walls.

2. In a rotary machine, a housing having an inwardly facing inner peripheral wall and a pair of spaced oppositely facing inner end walls, a rotor rotatably mounted in said housing having sides opposite said end walls and a plurality of corners that remain adjacent said peripheral wall as said rotor rotates, said rotor and said housing walls cooperatively defining a plurality of chambers separated by said rotor corners that expand and contract as said rotor rotates, each said rotor corner having an apex seal groove extending thereacross facing outwardly toward said peripheral wall and also having a corner seal hole in each said rotor side contiguous with said apex seal groove and facing outwardly toward one of said end walls, an apex seal mounted in said apex seal groove for engaging said peripheral wall, a corner seal mounted in each said corner seal hole for engaging the opposite end wall, said apex seal and said apex seal groove having bottoms with an apex seal spring space therebetween, said corner seals and said corner seal holes having bottoms with corner seal spring spaces therebetween open to said apex seal spring space, a single leaf spring located in said spaces, said leaf spring having two end portions of the same length and an intermediate portion of substantially greater length than said end portions with each said portion having an arcuate shape and with seat portions joining said intermediate portion and said end portions, said intermediate portion arranged in said apex seal spring space with all said seat portions positively seating on said apex seal groove bottom adjacent the ends thereof and engaging said bottom of said apex seal to bias said apex seal outwardly against said peripheral wall and with said end portions extending freely into said corner seal spring spaces and engaging said bottoms of said corner seals to bias said corner seals outwardly against said end walls.

3. In a rotary machine, a housing having an inwardly facing inner peripheral wall and a pair of spaced oppositely facing inner end walls, a rotor rotatably mounted in said housing having sides opposite said end walls and a plurality of corners that remain adjacent said peripheral wall as said rotor rotates, said rotor and said housing walls cooperatively defining a plurality of chambers separated by said rotor corners that expand and contract as said rotor rotates, each said rotor corner having an apex seal groove extending thereacross facing outwardly toward said peripheral wall and also having a corner seal hole in each said rotor side contiguous with said apex seal groove and facing outwardly toward one of said end walls, an apex seal mounted in said apex seal groove for engaging said peripheral wall, a corner seal mounted in each said corner seal hole for engaging the opposite end wall, said apex seal and said apex seal groove having bottoms with an apex seal spring space therebetween, said corner seals and said corner seal holes having bottoms with corner seal spring spaces therebetween open to said apex seal spring space, a single leaf spring located in said spaces, said leaf spring having two end portions of the same length and an intermediate portion of substantially greater length than said end portions with each said portion having a single convex curve and with concave seat portions joining said intermediate portion and said end portions, said intermediate portion arranged in said apex seal spring space with both said seat portions positively seating on said apex seal groove bottom adjacent the ends thereof and engaging said bottom of said apex seal at only a central location to bias said apex seal outwardly against said peripheral wall and with said end portions extending freely into said corner seal spring spaces and engaging said bottoms of said corner seals to bias said corner seals outwardly against said end walls whereby said leaf spring flexes in said intermediate portion between said spaced spring seat portions to take apex seal movement in compression and said end portions bend about said spring seat portions to take corner seal movement in tension to effect a spring bias on said apex seal greater than that on said corner seals.

* * * * *